United States Patent

McCloskey et al.

(10) Patent No.: US 9,332,191 B2
(45) Date of Patent: May 3, 2016

(54) METHOD AND SYSTEM FOR DETERMINING SHUTTER FLUTTERING SEQUENCE

(75) Inventors: Scott McCloskey, Minneapolis, MN (US); Jan Jelinek, Plymouth, MN (US); Kwong Wing Au, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1576 days.

(21) Appl. No.: 12/421,296

(22) Filed: Apr. 9, 2009

(65) Prior Publication Data

US 2010/0220896 A1 Sep. 2, 2010

Related U.S. Application Data

(60) Provisional application No. 61/156,739, filed on Mar. 2, 2009.

(51) Int. Cl.
*H04N 5/235* (2006.01)
*H04N 5/232* (2006.01)

(52) U.S. Cl.
CPC ......... *H04N 5/2353* (2013.01); *H04N 5/23229* (2013.01)

(58) Field of Classification Search
CPC .................. H04N 5/2353; H04N 5/23229
See application file for complete search history.

(56) References Cited

U.S. PATENT DOCUMENTS

| | | | |
|---|---|---|---|
| 4,141,650 A | 2/1979 | Nishikawa et al. | 355/35 C |
| 5,291,560 A | 3/1994 | Daugman | 382/2 |
| 5,528,334 A * | 6/1996 | Lee | 396/257 |
| 6,212,336 B1 * | 4/2001 | Tanaka et al. | 396/213 |
| 7,225,338 B2 | 5/2007 | Khan et al. | 713/186 |
| 7,336,806 B2 | 2/2008 | Schonberg et al. | 382/117 |
| 7,444,007 B2 | 10/2008 | Schonberg et al. | 382/117 |
| 2003/0199858 A1 * | 10/2003 | Schelonka | 606/5 |
| 2006/0238621 A1 * | 10/2006 | Okubo et al. | 348/208.99 |
| 2007/0025722 A1 * | 2/2007 | Matsugu et al. | 396/263 |

(Continued)

OTHER PUBLICATIONS

Raskar et al., "Coded exposure photography: motion deblurring using fluttered shutter", ACM Transactions on Graphics, Jul. 2006, ACM, USA, pp. 795-804.*

(Continued)

*Primary Examiner* — Karen Tang
(74) *Attorney, Agent, or Firm* — Kermit D. Lopez; Luis M. Ortiz; Kevin Soules

(57) ABSTRACT

A method, system and computer-usable medium for determining shutter fluttering sequence. The disclosed approach is based on the use of shutter flutter technology, which means that an image can be acquired in such a manner as to encode all information about the moving subject. The disclosed approach involves determining a shutter's fluttering pattern that optimally encodes information at all frequencies. The disclosed approach involves an optimization method for finding a shutter fluttering pattern that has several desired properties. These properties can be expressed in the context of a fitness function: given a fluttering pattern and the target subject's velocity, it produces the equivalent Modulation Transfer Function (MTF), measures three attributes, and produces a fitness score. These attributes are the minimum contrast, the variance in contrast across spatial frequencies, and the mean contrast. The objective of the disclosed approach is to determine the fluttering pattern that maximizes the fitness score.

20 Claims, 3 Drawing Sheets

(56) References Cited

U.S. PATENT DOCUMENTS

| | | | | |
|---|---|---|---|---|
| 2007/0036397 | A1 | 2/2007 | Hamza | 382/117 |
| 2007/0092245 | A1 | 4/2007 | Bazakos et al. | 396/427 |
| 2007/0189582 | A1 | 8/2007 | Hamza et al. | 382/117 |
| 2007/0198850 | A1 | 8/2007 | Martin et al. | 713/186 |
| 2007/0258706 | A1 | 11/2007 | Raskar et al. | 396/52 |
| 2007/0258707 | A1 | 11/2007 | Raskar | 396/52 |
| 2008/0212838 | A1* | 9/2008 | Frigerio | 382/107 |
| 2009/0277962 | A1 | 11/2009 | McCloskey | |
| 2010/0201798 | A1* | 8/2010 | Ren et al. | 348/78 |

OTHER PUBLICATIONS

"Variance", The Free Online Dictionary, Thesaurus and Encyclopedia, accessed Oct. 25, 2011 at <http://www.thefreedictionary.com/variance> (quoting Collins English Dictionary—Complete and Unabridged, 2003, HarperCollins Publishers).*

Microchip Technology Inc., "Microchip Technology New Product Information" (webpage), 1998-2011, accessed Oct. 25, 2011 at <http://www.microchip.com/stellent/idcplg?IdcService=SS_GET_PAGE&nodeId=2551>.*

"Fitness function", Wikipedia, the free encyclopedia, Wikimedia Foundation, Inc., ¶¶ 3 and 8, last modified on Jul. 16, 2011, accessed on Jun. 9, 2012 at <http://en.wikipedia.org/wiki/Fitness_function>.*

Driggers et al., "Equivalent blur as a function of spurious response of a sampled imaging system: application to character recognition", JOSA A, vol. 16, Issue 5, 1999, pp. 1026-1033.*

Facial Recognition System. http://cn.wikipedia.ong/wiki/Facial_recognition_system.

Iris Recognition. http://cn.wikipedia.org/wiki/Iris_recognition.

Raskar, R. et al., "Coded Exposure Photography: Motion Deblurring using Fluttered Shutter," *ACM Transactions on Graphics* Jul. 2006, ACM, USA, pp. 795-804.

Shi G.-M. et al, "High Resolution image Reconstruction: A New imager Via Movable Random Exposure," *Proceedings of the 2009 16th IEEE International Conference on Image Processing* (ICIP 2009), Piscataway, NJ, Nov. 7-12, pp. 1177-1180.

Great Britain Search Report for application GB0922049.2 dated Apr. 16, 2010.

* cited by examiner

METHOD AND SYSTEM FOR DETERMINING SHUTTER FLUTTERING SEQUENCE

CROSS-REFERENCE TO PROVISIONAL APPLICATION

This application claims the benefit of priority based on U.S. Provisional Patent Application Ser. No. 61/156,739 filed Mar. 2, 2009, entitled "Method and System for Determining Shutter Fluttering Sequence." The above-referenced provisional patent application is hereby incorporated by reference herein in its entirety.

STATEMENT OF GOVERNMENT RIGHTS

The invention disclosed in this application was made with Government support under Contract Number W91CRB-09-C-0013 awarded by the U.S. Army Research Office. The Government has certain rights in the invention.

TECHNICAL FIELD

Embodiments are generally related to the field of security systems and biometric identification. Embodiments are also related to iris-based and face recognition biometric authentication methods and systems. Embodiments are additionally related to flutter shutter technology. Embodiments are additionally related to image-processing techniques, devices, and systems.

BACKGROUND OF THE INVENTION

Acquiring sharply-focused images of moving people or objects is a fundamental and challenging problem in several surveillance applications, particularly iris-based biometrics and face recognition.

Iris recognition is a method of biometric authentication that utilizes pattern recognition techniques based on high-resolution images of the irises of an individual's eyes. Iris recognition relies on camera technology with subtle infrared illumination reducing specular reflection from the convex cornea to create images of the detail-rich, intricate structures of the iris. Converted into digital templates, these images provide mathematical representations of the iris that yield unambiguous positive identification of an individual.

Iris recognition has been recently recognized and gained much attention due to its high reliability in identifying humans. Its suitability as an exceptionally accurate biometric derives from its extremely data-rich physical structure, genetic independence (no two eyes are the same even for twins), stability over time, and non-contact means (a feature important for non-cooperative subjects).

Facial recognition typically involves the use of a computer application for automatically identifying or verifying a person from a digital image or a video frame from a video source. One of the ways to accomplish this is by comparing selected facial features from the image and a facial database.

One type of device that has been found in use in biometric identification and authentication is the flutter shutter camera, based on flutter shutter technology. Note that a non-limiting example of a flutter shutter camera and flutter shutter technology in general is disclosed in U.S. Patent Application Publication Serial No. US2007/0258707A1, entitled "Method and Apparatus for Deblurring Images," which published to Ramesh Raskar on Nov. 8, 2007, and is incorporated herein by reference. Another non-limiting example of a flutter shutter camera and flutter shutter technology is disclosed in U.S. Patent Application Publication Serial No. US2007/0258706A1, entitled "Method for Deblurring Images Using Optimized Temporal Coding Patterns," which published to Ramesh Raskar, et al on Nov. 8, 2007, and is incorporated herein by reference.

Iris-based biometric identification thus has great potential to enhance controlled access and even surveillance of high security areas. Much of this potential can only be realized by acquiring iris images from non-cooperative subjects. Like other applications that exploit visual information, however, iris-based biometrics is limited by the ability to acquire high-quality images in certain situations. One situation that is particularly challenging is the acquisition of sharply-focused iris images from moving subjects. Given a modest amount of light, as is common indoors, relatively long exposures are necessary at even the widest aperture setting. For moving subjects, this produces motion-blurred images which lack much of the crucial high-frequency information needed to perform iris matching.

For an application like iris recognition, wherein fine scale features are essential to proper classification, the use of a traditional shutter imposes some fundamental limits on the extent of motion blur that can be tolerated. Motion blur, as through a traditional shutter, is equivalent to convolution of a sharply-focused image with a box filter. Motion-blurred images of this type lack information regarding the object at a number of spatial frequencies. This lack of information is irreversible and no post processing can recover it from the image. Methods that attempt to deblur the image will severely amplify sensor noise, hallucinate content, or both. Though it may be useful in improving subjective image quality, hallucinating image content is counter-productive for forensic applications, and amplifying noise complicates iris matching.

To avoid this loss of information during image capture, some prior art approaches have advocated the use of a fluttering shutter and demonstrated the ability to recover high-quality images despite blur from moving objects. During exposure, the camera's shutter flutters between open and closed while exposure is accumulated on the sensor. This produces an image with coded blur which, unlike traditional blur, conveys information about the subject at all spatial frequencies. Given a suitably designed processing method that is based on the shutter's fluttering pattern, deblurring recovers an image with low levels of noise while avoiding reconstruction artifacts.

In moderate and low lighting conditions, however, the need to use long exposure times causes images of moving subjects to be significantly degraded by blur. This blur will destroy fine details of, for example, the subject's iris to an extent that the iris image will be useless for identification. It is therefore necessary to design systems that are capable of acquiring sharp images of subjects despite low lighting conditions and subject motion.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for a method and system for enhanced biometric identification.

It is another aspect of the present invention to provide for an enhanced shuttering method and system.

It is yet a further aspect of the present invention to provide for a method and system for determining a shutter fluttering sequence.

The aforementioned aspects and other objectives and advantages can now be achieved as described herein. A method and system for determining shutter fluttering sequence is disclosed. The disclosed approach is based on the use of shutter flutter camera technology, which means that an image can be acquired in such a manner as to encode all information about the moving subject. The disclosed approach involves determining a shutter's fluttering pattern that optimally encodes information at all frequencies. Previous approaches to determining such a shutter were incapable of incorporating constraints arising from the particular camera hardware and make the further unreasonable assumption that the shortest available open shutter time is sufficiently short to stop motion. The disclosed approach avoids these problems and identifies shutter patterns that can directly be utilized by a camera and software.

The disclosed approach involves optimization method for finding a shutter fluttering pattern that has several desired properties. These properties can be expressed in the context of a fitness function: given a fluttering pattern and the target subject's velocity, it produces the equivalent Modulation Transfer Function (MTF), measures three attributes, and produces a fitness score. These attributes are the minimum contrast, the variance in contrast across spatial frequencies, and the mean contrast. The objective of the disclosed approach is to determine the fluttering pattern that maximizes the fitness score.

As with most interesting problems, the space of potential fluttering patterns is prohibitively large to search exhaustively. One of the keys to the disclosed approach is that the search for the optimal (or a near-optimal) fluttering pattern can be made tractable by decomposing the search into a two-step process. The fluttering pattern is completely specified by knowing (1) the number and duration of each open shutter period and (2) the start time of each such open shutter period. The invented method performs the search for the near-optimal pattern by determining these two properties sequentially. It first determines the number and duration of open shutter periods using the observation that this choice determines the envelope on the MTF (i.e. an upper bound on the contrast at each spatial frequency).

Given a particular collection of open shutter periods that produces an envelope with good fitness, the second step determines the arrangement of those open shutter periods in the flutter pattern. This is achieved by creating an initial, naïve arrangement, and then by modifying that arrangement in a number of ways (while preserving the validity of the sequence) that improve the fitness score. Given methods that perform this modification, this second optimization step can be performed using a number of well-known computational techniques (hill climbing, simulated annealing, etc.).

At a high level, the disclosed embodiments take as input two parameters: the required exposure time (this will be the sum of the durations of the open shutter periods) and the subject velocity (measured in pixels per millisecond). The disclosed embodiments incorporate hardware constraints by respecting the minimum allowable open shutter duration. Its output is the fluttering pattern (for use with the camera control software), along with the equivalent MTF, point spread function (PSF), and fitness score (for analytic use).

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
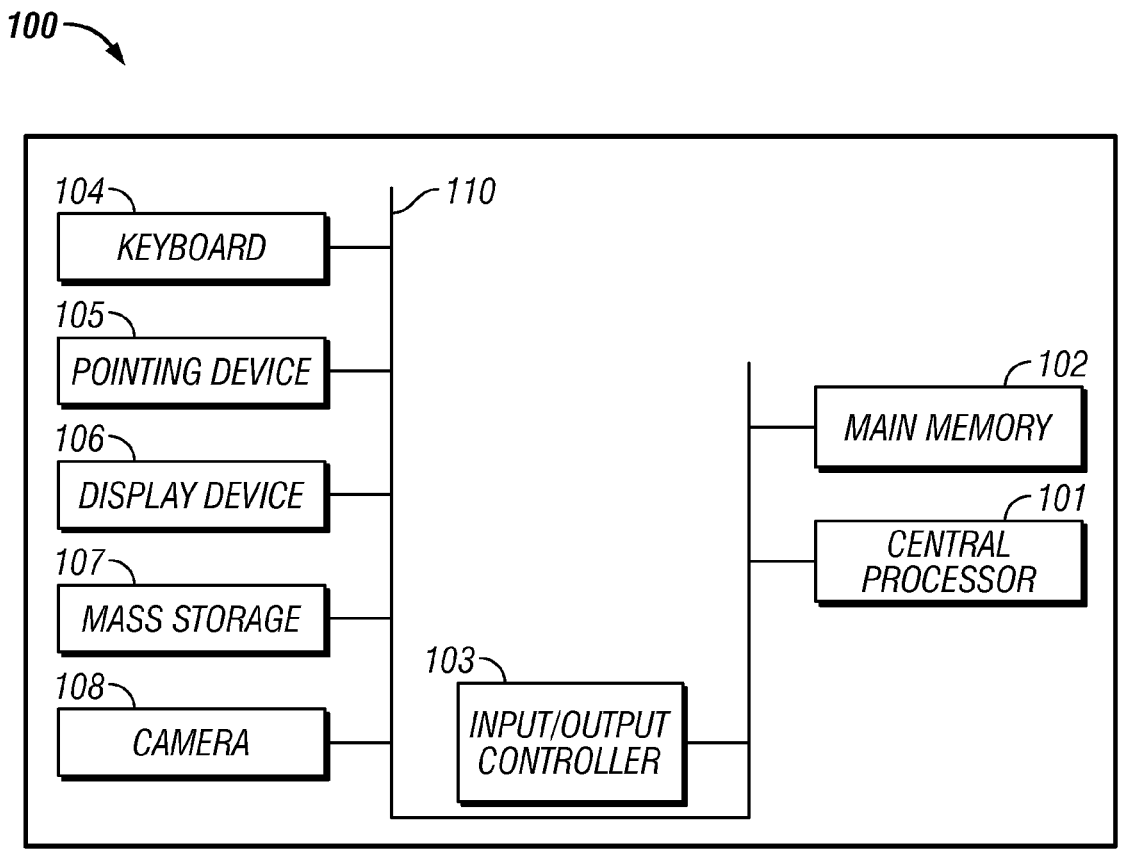
FIG. 1 illustrates a schematic view of a data-processing system which includes the use of a biometric reader, which may incorporate the use of, for example, a camera, in accordance with an example embodiment.
Figure 2:
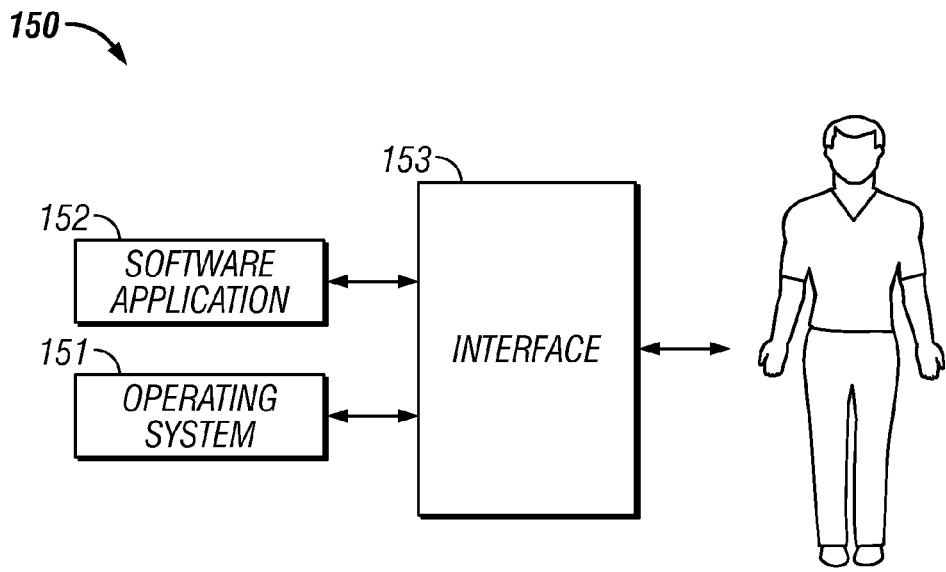
FIG. 2 illustrates a schematic view of a software system including an operating system, application software, and a user interface, in accordance with an example embodiment.
Figure 3:
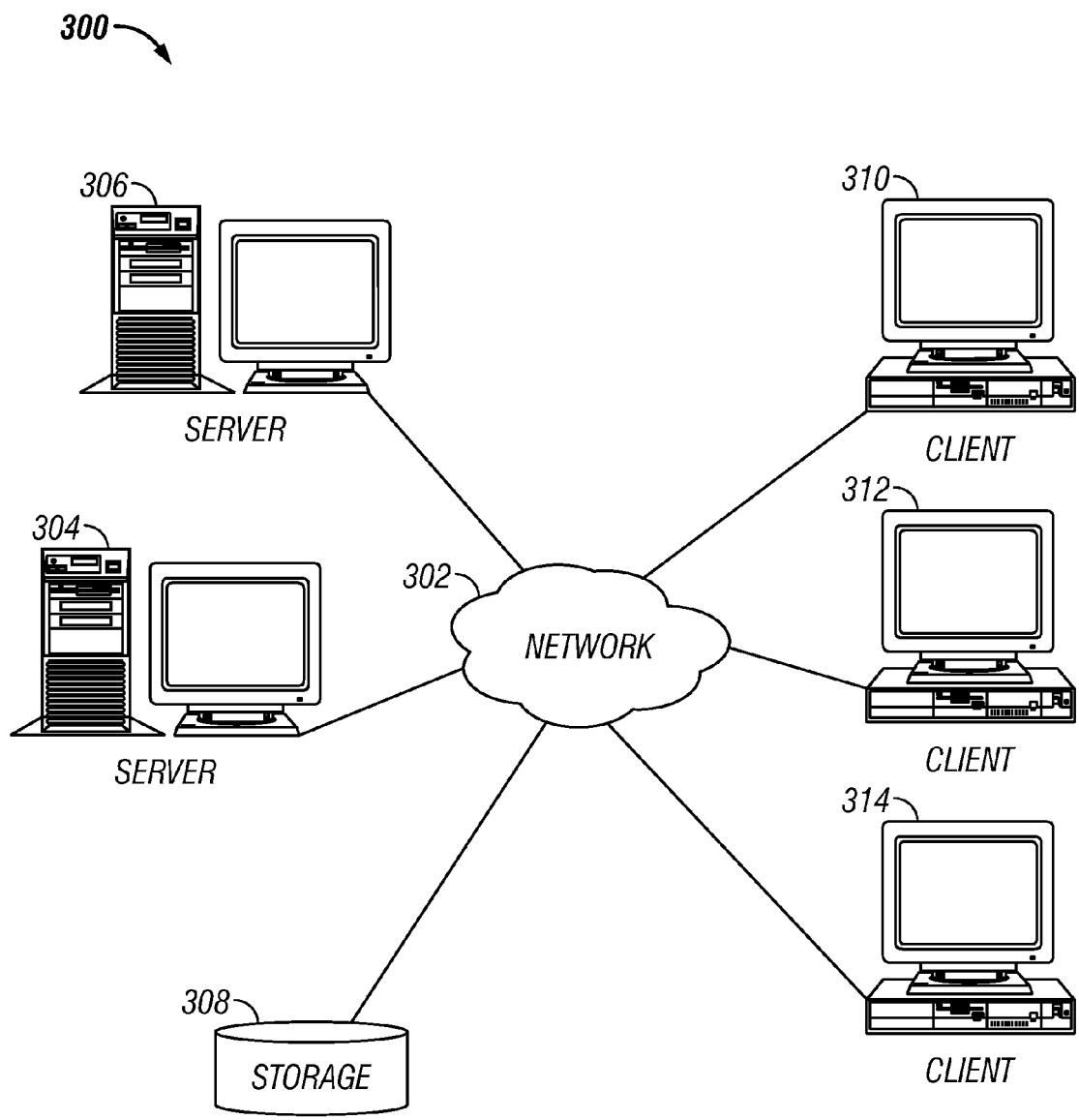
FIG. 3 depicts a graphical representation of a network of data-processing systems, which may be utilized in accordance with an example embodiment.

FIGS. 1-3 are provided as exemplary diagrams of data-processing environments, which can be implemented in accordance with one or more example embodiments. It should be appreciated that FIGS. 1-3 are only exemplary and are not intended to assert or imply any limitation with regard to the environments in which aspects of the disclosed example embodiments may be implemented. Many modifications to the depicted environments may be made without departing from the spirit and scope of the disclosed example embodiments.

As depicted in FIG. 1, a data-processing system 100 can include, for example, a central processor 101, a main memory 102, an input/output controller 103, a keyboard 104, a pointing device 105 (e.g., mouse, track ball, pen device, or the like), a display device 106, and a mass storage component 107 (e.g., hard disk). A camera 108 may be employed to communicate with the data-processing system 100. Camera 108 can be implemented as, for example, a flutter shutter camera, which may be employed in the context of a biometric authentication system such as, for example, an iris and/or facial biometric recognition system or device. A flutter shutter camera can be configured as a camera capable of capturing moving objects at an exposure time of, for example, over 50 milliseconds, like high speed motion cameras. Using a coded exposure sequence, the flutter shutter camera can recover, for example, text from a speeding car and sharpen images. As illustrated, the various components of the example embodiment of data-processing system 100 can communicate through a system bus 110 or similar architecture.

FIG. 2 illustrates a computer software system 150 for directing the operation of the data-processing system 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), can also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to the operating system 151 and interface 153. Application module 152, on the other hand, can include instructions such as the various operations described herein with respect to the various components and modules described herein such as, for example, the methods 400 and 500 depicted respectively in FIGS. 4-5.

FIG. 3 illustrates a graphical representation of a network of data processing systems in which aspects of the present invention may be implemented. Network data processing system 300 can be provided as a network of computers in which embodiments of the present invention may be implemented. Network data processing system 300 contains network 302, which can be utilized as a medium for providing communications links between various devices and computers connected together within network data processing system 100. Network 302 may include connections such as wired, wireless communication links, fiber optic cables, USB cables, Ethernet connections, and so forth.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In some embodiments, network data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as, for example, a secure intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100, computer software system 150, data-processing system 300, and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
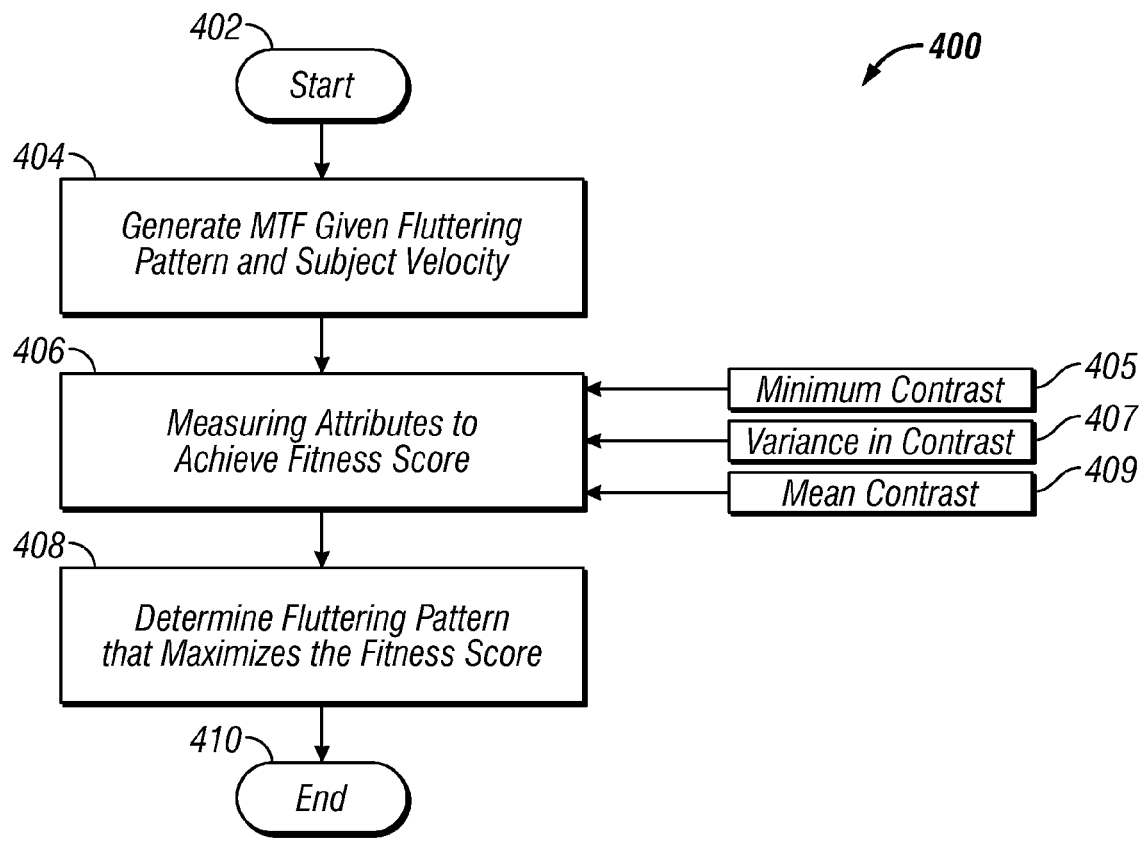
FIG. 4 illustrates a high-level flow chart of operations depicting logical operational steps of a method of determining a shutter fluttering sequence, in accordance with an example embodiment.

FIG. 4 illustrates a high-level flow chart of operations depicting logical operational steps of a method 400 of determining a shutter fluttering sequence, in accordance with a preferred embodiment. Note that the method 400 of FIG. 4 and method 500 of FIG. 5, and other methodologies disclosed herein, can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems.

It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods 400 and 500, for example, described herein can be deployed as process software in the context of a computer system or data-processing system as that depicted in FIGS. 1-3.

Note that the disclosed embodiments describe and illustrate an optimization method for finding a shutter fluttering pattern that has several desired properties. As indicated at block 402, the process begins. Such properties can be expressed in the context of a fitness function. As illustrated at block 404, given a fluttering pattern and a target subject's velocity, the equivalent Modulation Transfer Function (MTF) can be generated. Thereafter, as depicted at block 406, an operation can be processed for measuring three attributes, and thereafter, as indicated at block 408, producing a fitness score. The three attributes are the minimum contrast as indicated at block 405, the variance in contrast across spatial frequencies as illustrated at block 407, and the mean contrast as illustrated at block 409. The objective of method 400 is to determine the fluttering pattern that maximizes the fitness score. The process can then terminate, as indicated at block 410.

As with most interesting problems, the space of potential fluttering patterns is prohibitively large to search exhaustively. One of the keys to the approach described herein is that the search for the optimal (or a near-optimal) fluttering pattern can be made tractable by decomposing the search into a two-step process.

Figure 5:
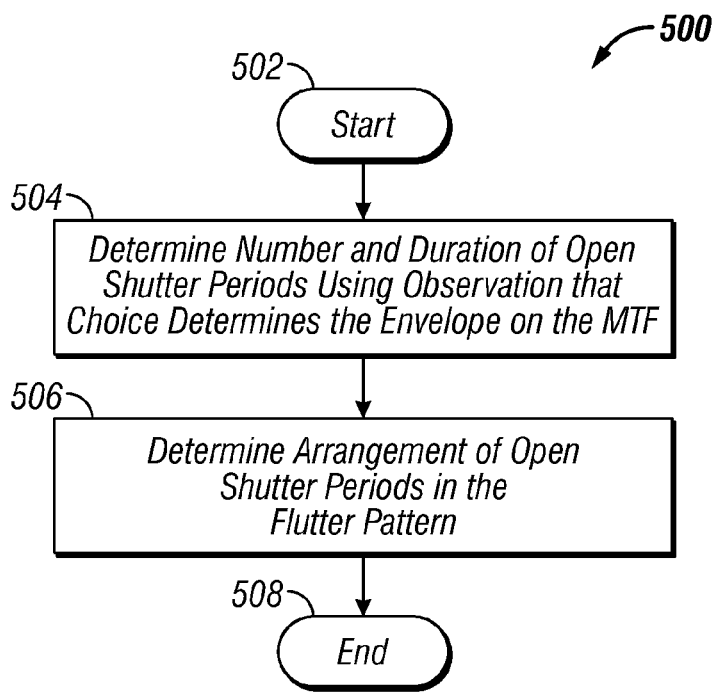
FIG. 5 illustrates a high-level flow chart of operations depicting logical operational steps of a method of determining a shutter fluttering sequence, in accordance with a preferred example embodiment.

FIG. 5 illustrates a high-level flow chart of operations depicting logical operational steps of a method 500 of determining a shutter fluttering sequence, in accordance with a preferred embodiment. Note that method 500 depicted in FIG. 5 represents a further refinement to the general methodology of method 400. As indicated by the approach of method 500 depicted in FIG. 5, the fluttering pattern can be completely specified by determining (1) the number and duration of each open shutter period, and (2) the start time of each such open shutter period. The process generally begins, as illustrated at block 502.

The instructions of method 500 perform the search for the near-optimal pattern by determining these two properties sequentially. The approach of method 500 first determines the number and duration of open shutter periods using the observation that this choice determines the envelope on the MTF (i.e. an upper bound on the contrast at each spatial frequency), as indicated at block 504. Given a particular collection of open shutter periods that produces an envelope with good fitness, the second step, as indicated at block 506, determine the arrangement of those open shutter periods in the flutter pattern. This can be achieved by creating an initial, naïve arrangement, and then by modifying that arrangement in any one of a number of approaches (while preserving the validity of the sequence) that improve the fitness score. Given methods that perform this modification, this second optimization step can be performed using a number of well-known computational techniques (hill climbing, simulated annealing, etc.). Thus, process can then terminate, as indicated at block 508.

At a high level, the methods 400 and 500 receive as input, two parameters: the required exposure time (this will be the sum of the durations of the open shutter periods) and the subject velocity (measured in pixels per millisecond). The approach of methods 400 and 500 incorporate hardware constraints by respecting the minimum allowable open shutter duration. The output of methods 400 and 500 is the fluttering pattern (for use with the camera control software), along with the equivalent MTF, point spread function (PSF), and fitness score (for analytic use).

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" or "data-processing system" includes any data-processing apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

What is claimed is:

1. A method for fluttering a shutter according to a determined shutter fluttering sequence, said method comprising:
   determining a modulation transfer function based on a particular shutter fluttering pattern and at least two properties associated with a target subject, said particular shutter fluttering pattern associated with a flutter shutter camera;
   determining a minimum allowable open shutter duration for said flutter shutter camera;
   measuring a plurality of attributes associated with said modulation transfer function, said measured attributes being combined to produce a fitness score;
   identifying a fluttering pattern that maximizes said fitness score;
   selecting a shutter fluttering sequence with respect to said shutter flutter and said target subject according to said fluttering pattern that maximizes said fitness score; and
   communicating said shutter fluttering sequence to said flutter shutter camera in order to flutter said shutter of said flutter shutter camera according to said shutter fluttering sequence.

2. The method of claim 1 wherein identifying a fluttering pattern that maximizes said fitness score, further comprises specifying said fluttering pattern by sequentially:
   first determining a number and a duration of each open shutter period with respect to at least one constraint associated with said flutter shutter camera; and
   second identifying a start time of each open shutter period.

3. The method of claim 1 wherein said at least one property associated with said target subject comprises a velocity of said target subject.

4. The method of claim 1 wherein at least one attribute among said plurality of attributes comprises a minimum contrast.

5. The method of claim 1 wherein at least one attribute among said plurality of attributes comprises a variance in contrast across a plurality of spatial frequencies.

6. The method of claim 1 wherein at least one attribute among said plurality of attributes comprises a mean contrast.

7. The method of claim 1 further comprising:
   capturing an image of said target subject from among a plurality of subjects in said image via said flutter shutter camera.

8. The method of claim 7 further comprising:
   utilizing said shutter fluttering sequence with respect to said flutter shutter camera and said target subject; and
   biometrically identifying said target subject among said plurality of subjects.

9. A system for fluttering a shutter according to a determined shutter fluttering sequence, said system comprising:
   a flutter shutter camera;
   a processor;
   a data bus coupled to the processor; and
   a computer-usable medium embodying computer code, the computer-usable medium being coupled to the data bus, the computer program code comprising instructions executable by the processor and configured for:
      determining a modulation transfer function based on a particular shutter fluttering pattern and at least two properties associated with a target subject, said particular shutter fluttering pattern associated with said flutter shutter camera;
      determining a minimum allowable open shutter duration for said flutter shutter camera;
      measuring a plurality of attributes associated with said modulation transfer function, said measured attributes being combined to produce a fitness score;
      identifying a fluttering pattern that maximizes said fitness score;
   selecting a shutter fluttering sequence with respect to said shutter flutter and said target subject according to said fluttering pattern that maximizes said fitness score; and
   communicating said shutter fluttering sequence to said flutter shutter camera in order to flutter said shutter of said flutter shutter camera according to said shutter fluttering sequence.

10. The system of claim 9 wherein said instructions for identifying a fluttering pattern that maximizes said fitness score are further configured to specify said fluttering pattern by sequentially:
first determining a number and a duration of each open shutter period with respect to at least one constraint of said flutter shutter camera; and
second identifying a start time of each open shutter period.

11. The system of claim 9 wherein said at least one property associated with said target subject comprises a velocity of said target subject.

12. The system of claim 9 wherein at least one attribute among said plurality of attributes comprises a minimum contrast.

13. The system of claim 9 wherein at least one attribute among said plurality of attributes comprises a variance in contrast across a plurality of spatial frequencies.

14. The system of claim 9 wherein at least one attribute among said plurality of attributes comprises a mean contrast.

15. The system of claim 9 wherein said instructions are further configured for capturing an image of said target subject from among a plurality of subjects in said image via said flutter shutter camera.

16. The system of claim 15 wherein said instructions are further configured for utilizing said shutter fluttering sequence with respect to said flutter shutter camera and said target subject; and
biometrically identifying said target subject among said plurality of subjects.

17. An apparatus for fluttering a shutter according to a determined shutter fluttering sequence, said apparatus comprising:
a shutter flutter camera; and
a non-transitory computer-usable medium for determining a shutter fluttering sequence, said computer-usable medium embodying computer program code, said computer program code comprising computer executable, instructions configured for:
determining a modulation transfer function based on a particular shutter fluttering pattern and at least two properties associated with a target subject, said particular shutter fluttering pattern associated with said flutter shutter camera;
determining a minimum allowable open shutter duration for said flutter shutter camera;
measuring a plurality of attributes associated with said modulation transfer function, said measured attributes being used to produce a fitness score;
identifying a fluttering pattern that maximizes said fitness score;
selecting a shutter fluttering sequence with respect to said shutter flutter and said target subject according to said fluttering pattern that maximizes said fitness score; and
communicating said shutter fluttering sequence to said flutter shutter camera in order to flutter said shutter of said flutter shutter camera according to said shutter fluttering sequence.

18. The apparatus of claim 17 wherein said embodied computer program code for identifying a fluttering pattern that maximizes said fitness score, further comprises computer executable, instructions for specifying said fluttering pattern by sequentially:
first determining a number and a duration of each open shutter period with respect to at least one constraint of said flutter shutter camera; and
second identifying a start time of each open shutter period.

19. The apparatus of claim 17 wherein said at least one property associated with said target subject comprises a velocity of said target subject.

20. The apparatus of claim 17 wherein at least one attribute among said plurality of attributes comprises at least one of the following types of attributes: a minimum contrast, a variance in contrast across a plurality of spatial frequencies, and a mean contrast.

* * * * *